(12) United States Patent
Suciu et al.

(10) Patent No.: US 8,347,637 B2
(45) Date of Patent: Jan. 8, 2013

(54) ACCESSORY GEARBOX WITH INTERNAL LAYSHAFT

(75) Inventors: Gabriel L. Suciu, Glastonbury, CT (US); Christopher M. Dye, Glastonbury, CT (US); Nathan Snape, Tolland, CT (US); Hung Duong, Unionville, CT (US)

(73) Assignee: United Technologies Corporation, Hartford, CT (US)

( * ) Notice: Subject to any disclaimer, the term of this patent is extended or adjusted under 35 U.S.C. 154(b) by 262 days.

(21) Appl. No.: 12/787,385

(22) Filed: May 25, 2010

(65) Prior Publication Data

US 2011/0289936 A1 Dec. 1, 2011

(51) Int. Cl.
*F16H 57/00* (2012.01)

(52) U.S. Cl. ........................ 60/802; 47/606 R (58) Field of Classification Search .................. 60/802, 60/788, 786; 74/606 R, 665 F, 665 G, 665 H, 74/665 K, 410, 411, 11, 15.2
See application file for complete search history.

(56) References Cited

U.S. PATENT DOCUMENTS

| 2,470,155 | A | | 5/1949 | Forsyth |
| 2,596,363 | A | | 5/1952 | Breguet |
| 2,803,943 | A | | 8/1957 | Rainbow |
| 2,937,703 | A | | 5/1960 | Chamberlin |
| 2,978,869 | A | * | 4/1961 | Hiscock et al. ............. 60/802 |
| 3,050,275 | A | | 8/1962 | Kottsieper |
| 3,269,118 | A | | 8/1966 | Benedict et al. |
| 3,332,242 | A | | 7/1967 | Johnson |
| 3,455,182 | A | | 7/1969 | Kelley |
| 3,543,588 | A | | 12/1970 | Richardson |
| 3,799,473 | A | | 3/1974 | Bortel |
| 3,921,940 | A | | 11/1975 | Mouille |
| 3,977,632 | A | | 8/1976 | Watson |
| 4,163,535 | A | | 8/1979 | Austin |
| 4,437,627 | A | | 3/1984 | Moorehead |
| 4,458,862 | A | | 7/1984 | Mouille et al. |
| 4,479,619 | A | | 10/1984 | Saunders et al. |
| 4,489,625 | A | | 12/1984 | White |
| 4,525,995 | A | | 7/1985 | Clark |
| 4,632,337 | A | | 12/1986 | Moore |
| 4,659,287 | A | | 4/1987 | Garavaglia et al. |
| 4,783,023 | A | | 11/1988 | Jupe |
| 4,899,959 | A | | 2/1990 | Weiler |
| 5,410,870 | A | | 5/1995 | Brault et al. |
| 5,687,561 | A | | 11/1997 | Newton |
| 6,357,220 | B1 | | 3/2002 | Snyder et al. |
| 6,364,249 | B1 | | 4/2002 | Morgan et al. |
| 6,851,267 | B2 | | 2/2005 | Bruno et al. |
| 7,500,365 | B2 | | 3/2009 | Suciu et al. |
| 7,500,935 | B2 | | 3/2009 | Waide |

(Continued)

FOREIGN PATENT DOCUMENTS

EP 1939429 7/2008

(Continued)

OTHER PUBLICATIONS

Mounting Arrangement for Gas Turbine Engine Accessories and Gearbox Therefor; U.S. Appl. No. 12/750,167, filed Mar. 30, 2010.
European Search Report received Jun. 14, 2012.

*Primary Examiner* — Ehud Gartenberg
*Assistant Examiner* — Vikansha Dwivedi
(74) *Attorney, Agent, or Firm* — Carlson, Gaskey & Olds (57) ABSTRACT

An engine accessory system for a gas turbine engine includes a first accessory component mountable to an accessory gearbox along a first accessory axis transverse to a layshaft axis of rotation.

15 Claims, 13 Drawing Sheets

U.S. PATENT DOCUMENTS

| | | |
|---|---|---|
| 2005/0150204 A1 | 7/2005 | Stretton et al. |
| 2009/0180864 A1 | 7/2009 | Alvanos et al. |
| 2009/0188334 A1 | 7/2009 | Merry et al. |
| 2009/0290976 A1 | 11/2009 | Suciu et al. |
| 2009/0317229 A1 | 12/2009 | Suciu et al. |

FOREIGN PATENT DOCUMENTS

| | | |
|---|---|---|
| GB | 626036 | 7/1949 |
| GB | 839961 | 6/1960 |
| JP | 2001317373 | 11/2001 |

\* cited by examiner

ACCESSORY GEARBOX WITH INTERNAL LAYSHAFT

BACKGROUND

The present disclosure relates to a gas turbine engines, and more particularly to an accessory gearbox therefor.

Aircraft powered by gas turbine engines often include a mechanically driven accessory gearbox to drive accessory systems such as fuel pumps, scavenge pumps, electrical generators, hydraulic pumps, etc. These components typically operate at different speeds from one another and require differing amounts of horsepower as provided by the accessory gearbox.

Conventional gas turbine engine accessory gearboxes utilize a gearbox case mountable underneath the engine. The gearbox case is typically crescent-shaped with forward and aft faces to which the accessory components are mounted. The accessory gearbox is driven by an angle gearbox through a layshaft which axially extends from the gearbox case. A towershaft driven by the engine high-pressure spool drives the layshaft through the angle gearbox.

SUMMARY

An accessory system for a gas turbine engine according to an exemplary aspect of the present disclosure includes a first accessory component mountable to an accessory gearbox along a first accessory axis transverse to a layshaft axis of rotation.

An accessory system for a gas turbine engine according to an exemplary aspect of the present disclosure includes a first accessory component mountable to an accessory gearbox along a first accessory axis and a second accessory component mounted to the accessory gearbox along a second accessory axis, the first accessory axis and the second accessory axis defines a V-orientation.

A gas turbine engine according to an exemplary aspect of the present disclosure includes an engine case section defined about an engine axis of rotation. A first accessory component mountable to the accessory gearbox along a first accessory axis transverse to a layshaft axis of rotation and a second accessory component mountable to the accessory gearbox along a second accessory axis transverse to the layshaft axis of rotation, the first accessory axis and said second accessory axis defines a V-orientation.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
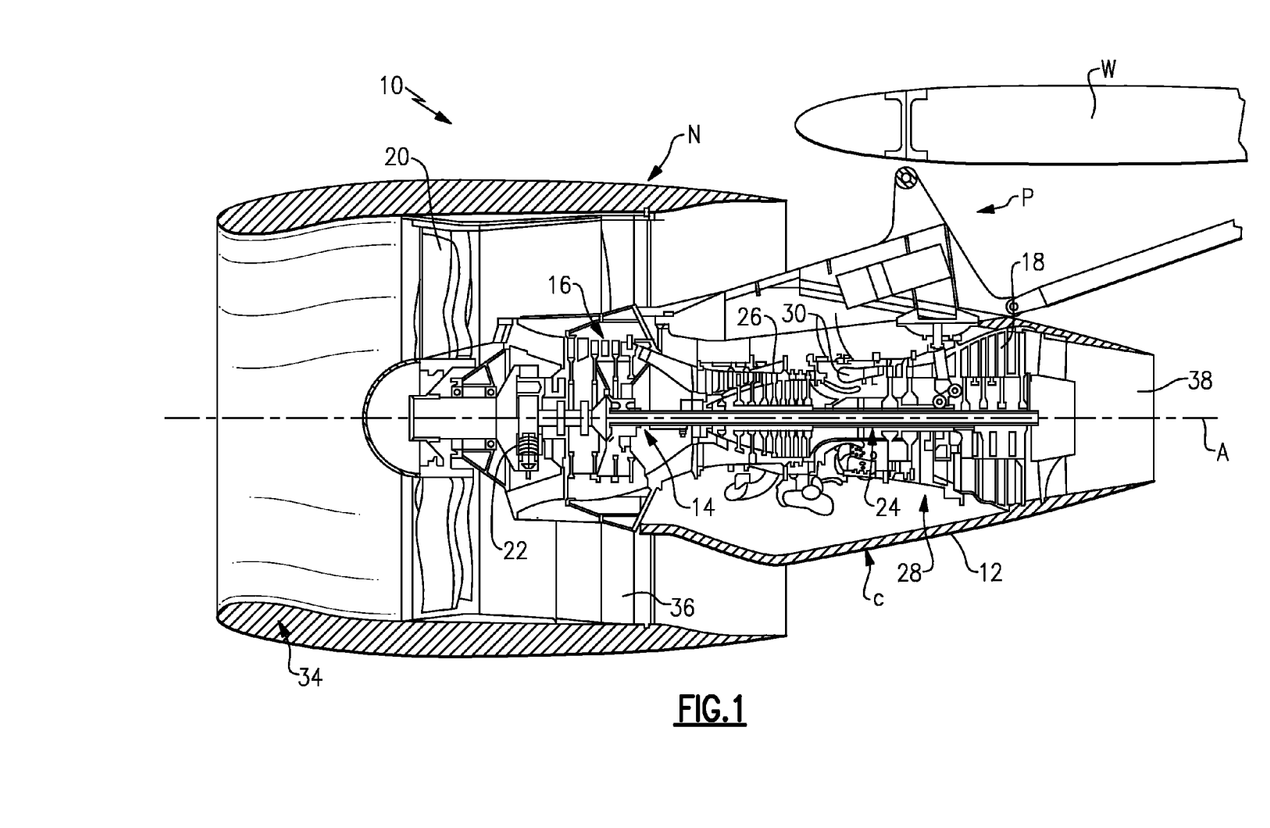
FIG. 1 is a general sectional view through a gas turbine engine along the engine longitudinal axis.

FIG. 1 illustrates a general partial fragmentary schematic view of a gas turbine engine 10 suspended from an engine pylon P within an engine nacelle assembly N as is typical of an aircraft designed for subsonic operation. The engine pylon P or other support structure is typically mounted to an aircraft wing W, however, the engine pylon P may alternatively extend from other aircraft structure such as an aircraft empennage.

The gas turbine engine 10 includes a core engine C within a core nacelle 12 that houses a low spool 14 and high spool 24. The low spool 14 includes a low pressure compressor 16 and low pressure turbine 18. The low spool 14 may drive a fan section 20 either directly or through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in the disclosed embodiment is a high-bypass geared architecture aircraft engine. In one disclosed embodiment, the engine 10 bypass ratio is greater than ten (10:1), the turbofan diameter is significantly larger than that of the low pressure compressor 16, and the low pressure turbine 18 has a pressure ratio that is greater than 5:1. The gear train 22 may be an epicycle gear train such as a planetary gear system or other gear system with a gear reduction ratio of greater than 2.5:1. It should be understood, however, that the above parameters are only exemplary of one embodiment of a geared architecture engine and that the present application is applicable to other gas turbine engines including direct drive turbofans.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and, through the optional gear train 22, the fan section 20 in response to the expansion. A core engine exhaust exits the core nacelle 12 through a core nozzle 38 defined between the core nacelle 12 and a tail cone 32.

A bypass flow path is defined between the core nacelle 12 and the fan nacelle 34. The engine 10 generates a high bypass flow arrangement with a bypass ratio in which approximately 80 percent of the airflow entering the fan nacelle 34 becomes bypass flow. The bypass flow communicates through the generally annular bypass flow path.

Figure 2:
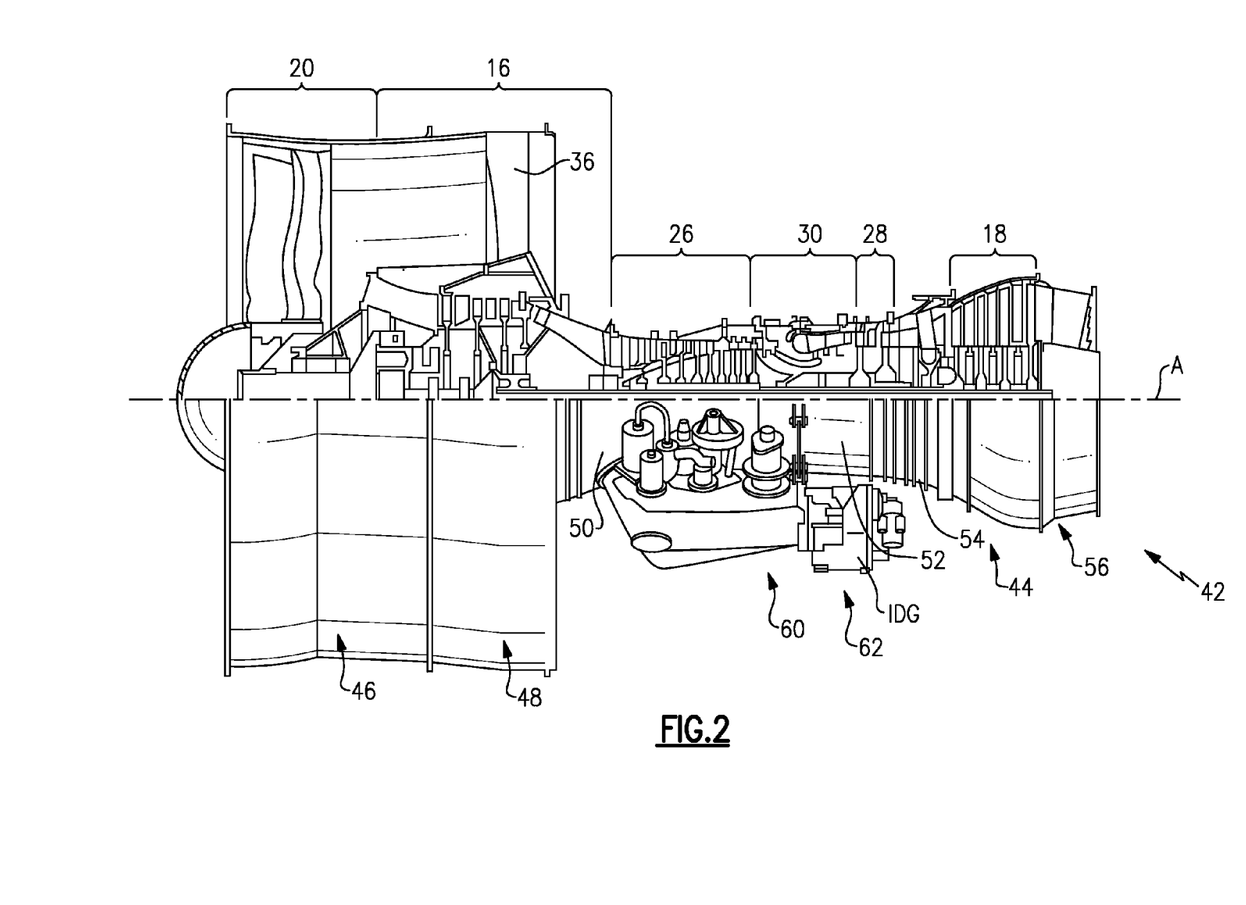
FIG. 2 is a general partial sectional view through a gas turbine engine along the engine longitudinal axis illustrating an engine static structure case arrangement on the lower half thereof with an accessory system mounted thereto.

Referring to FIG. 2, engine static structure 42 includes sub-structures such as a core engine case structure 44 often referred to as the engine backbone. The engine case structure 44 generally includes a fan case 46, an intermediate case (IMC) 48, a high pressure compressor case 50, a diffuser case 52, a low pressure turbine case 54, and a turbine exhaust case 56. The core engine case structure 44 is secured to the fan case 46 at the IMC 48 which includes a multiple of circumferentially spaced radially extending fan exit guide vanes (FEGVs) 36.

Figure 3:
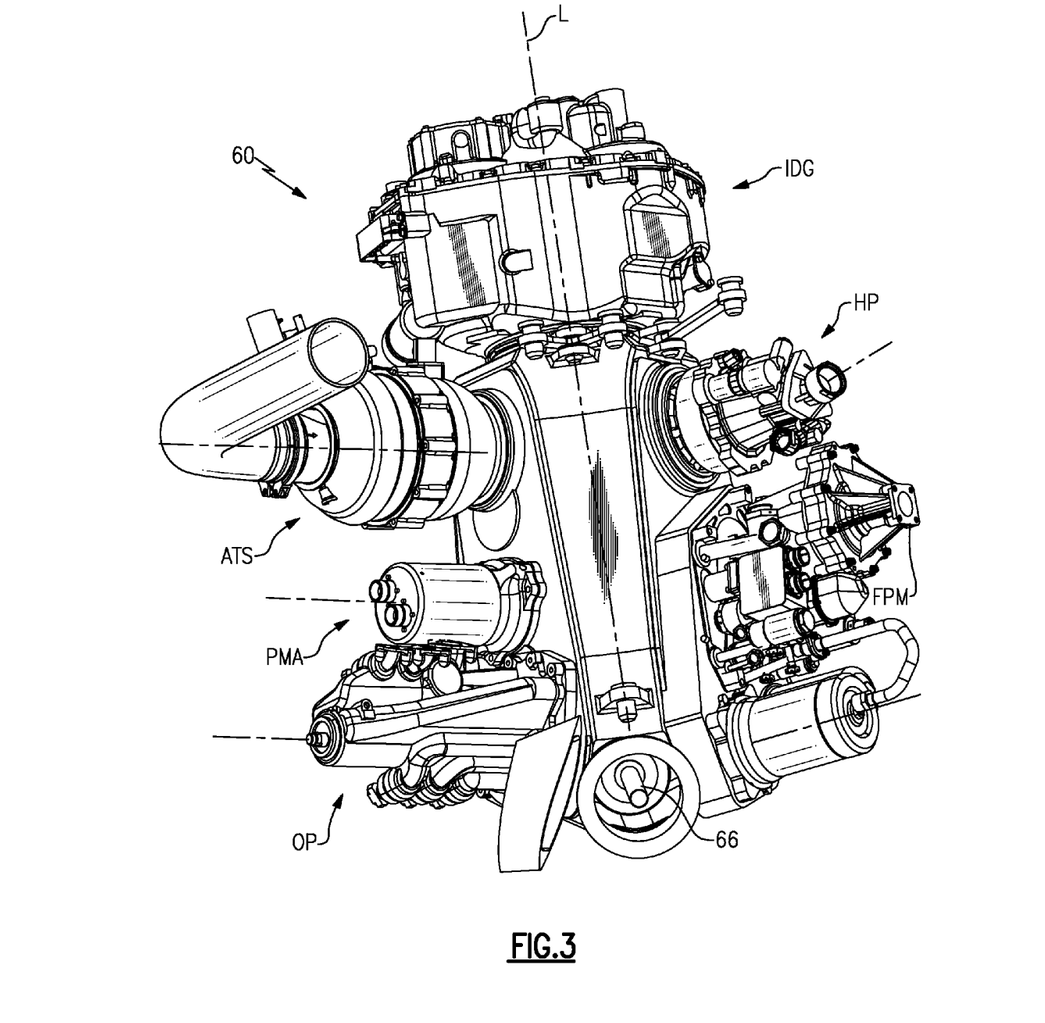
FIG. 3 is a general top view of an accessory system with a multiple of accessory components mounted thereto.

An accessory gearbox 60 is mounted to the case structure 44 generally parallel to the engine axis of rotation A. The accessory gearbox 60 takes advantage of the significant axial area within the core nacelle C (FIG. 1) to support an engine accessory system 62 which may include accessory components (AC)s such as an Air Turbine Starter (ATS), a deoiler (D), a hydraulic pump (HP), an oil pump (OP), an integrated drive generator (IDG), a permanent magnet alternator (PMA), a fuel pump module (FMP), and others (FIG. 3). It should be understood, that any number and type of accessory components AC may alternatively or additionally be provided.

Figure 4:
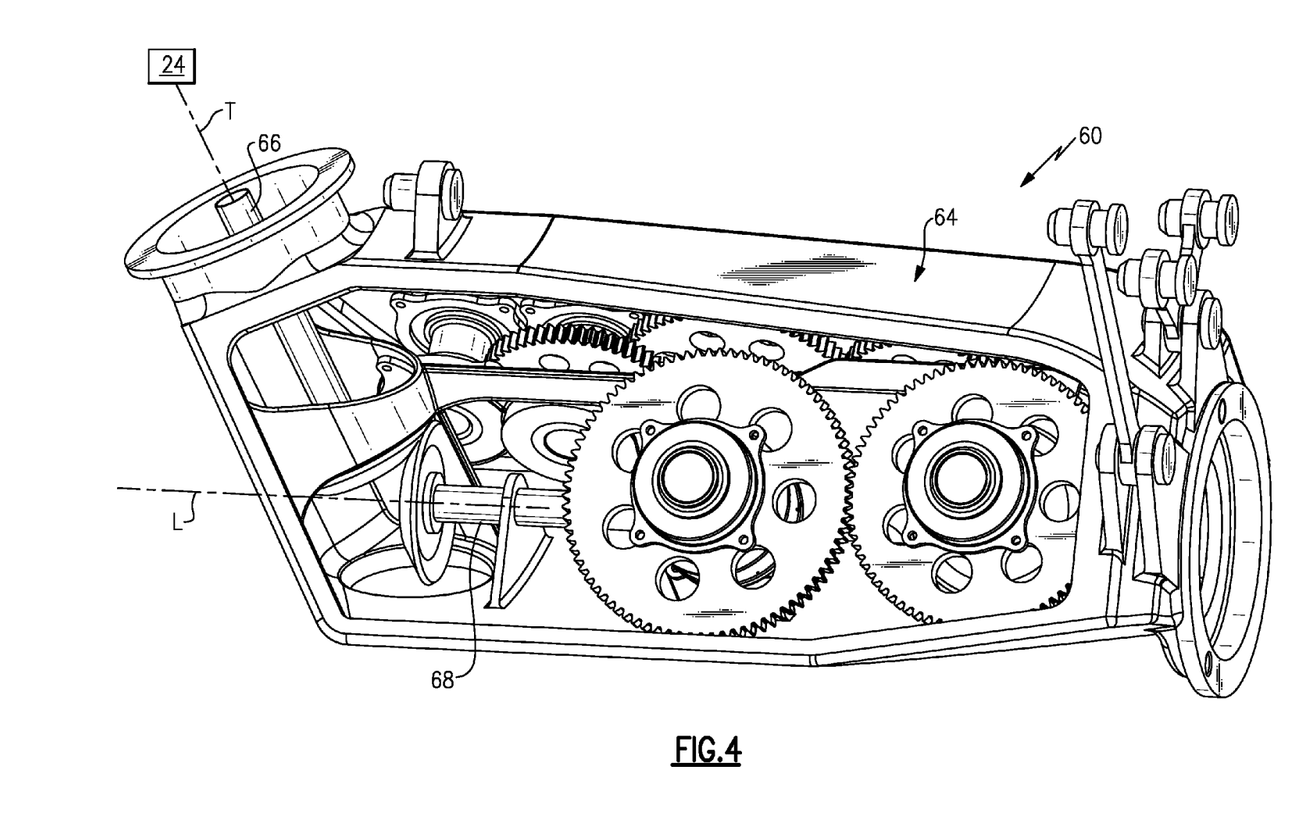
FIG. 4 is a side view of the accessory system with a side cover removed.

Referring to FIG. 4, the accessory gearbox 60 includes a housing assembly 64 which at least partially supports a towershaft 66 and layshaft 68. The towershaft 66 defines a towershaft axis of rotation T generally transverse to the engine axis of rotation A from which the towershaft 66 extends (FIG. 2). It should be understood that the towershaft 66 is in meshing engagement and typically driven by the high spool 24. Various towershaft 66 arrangements will benefit herefrom.

The layshaft 68 defines a layshaft axis of rotation L generally parallel to the engine axis of rotation A (FIG. 2). That is, the housing assembly 64 provides an integral housing for the towershaft 66 and the layshaft 68 which otherwise conventionally required a separate angled gearbox housing which extends from the crescent shaped accessory gearbox.

Referring to FIGS. 5A-5D, the housing assembly 64 includes a main case 74, a first cover 76 and a second cover 78. The main case 74 includes support points 70A, 70B for attachment to the case structure 44 through a multiple of links 72 which constrain relative movement of the housing assembly 64 in six-degrees of freedom. It should be understood that various attachment arrangements may additionally or alternatively be provided.

Figure 6:
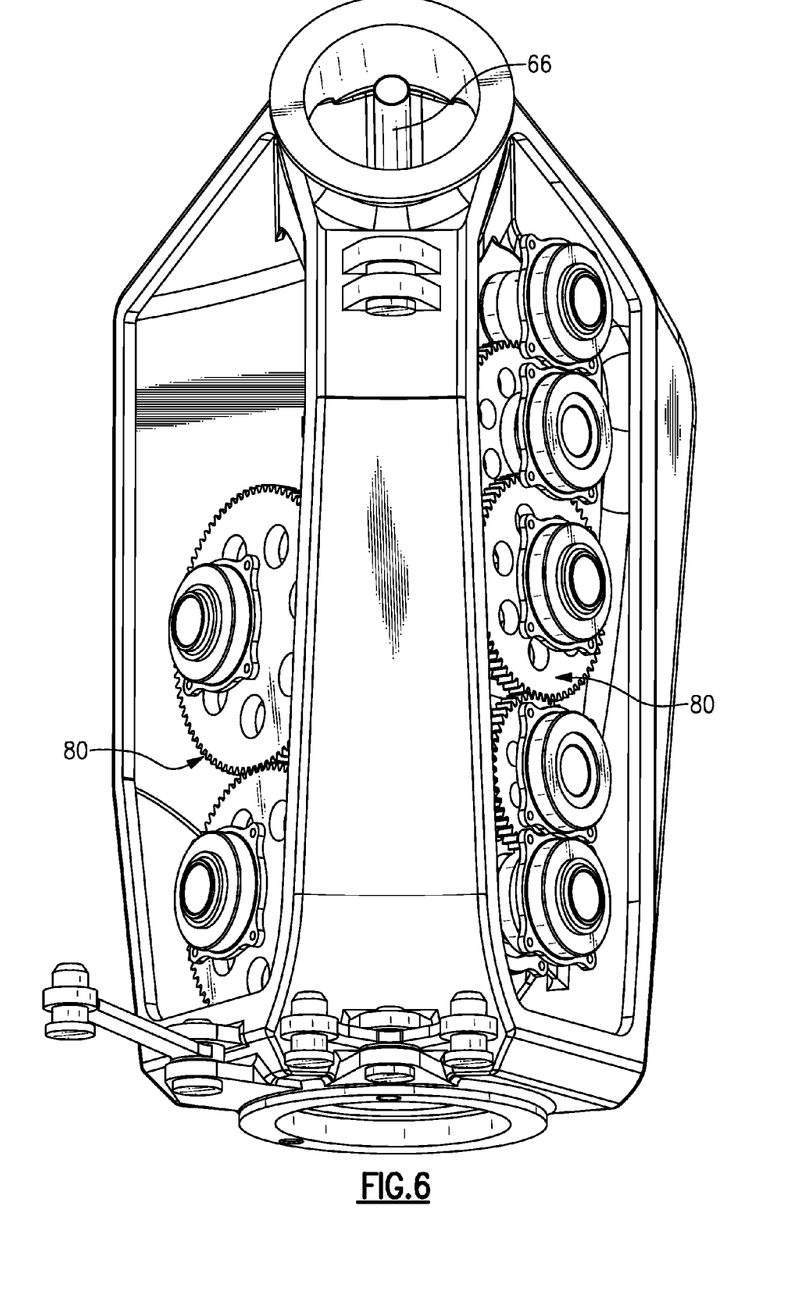
FIG. 6 is a general top view of an accessory system with the side covers removed to illustrate the geartrain therein.

The covers 76, 78 define angled, non-parallel sides of the housing assembly 64. The covers 76, 78 are removable to access a geartrain 80 (FIG. 6). It should be understood that various other covers and access panels may alternatively or additionally be provided.

Figure 5A:
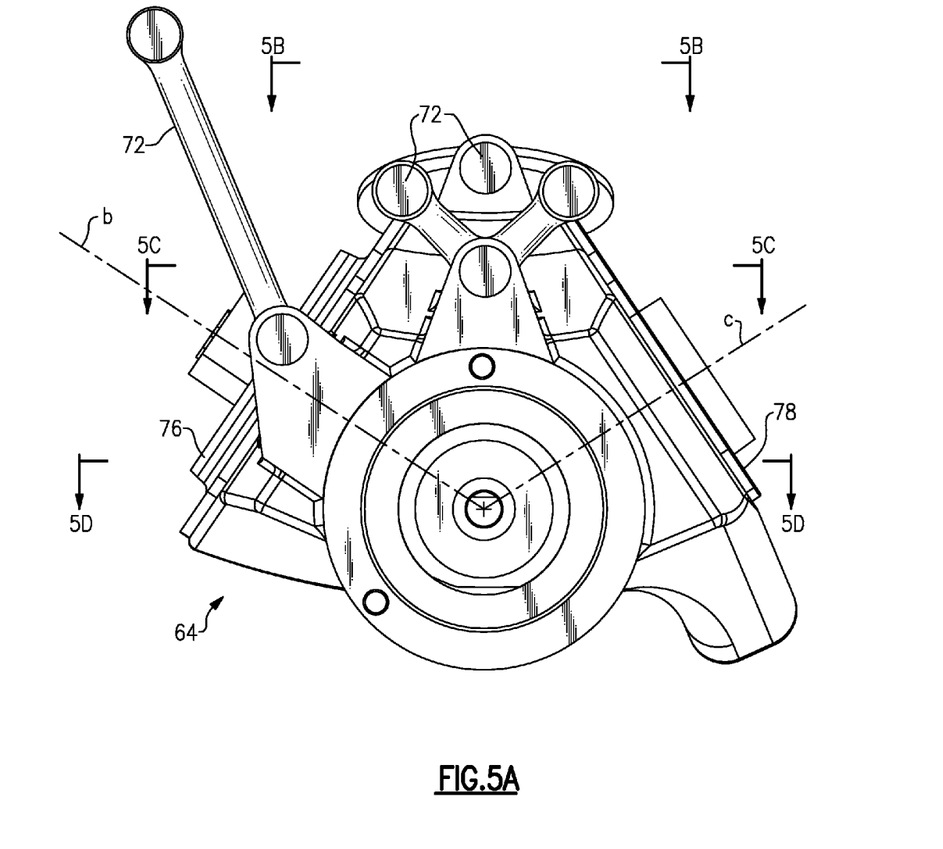
FIG. 5A is a rear view of the accessory system.
Figure 5B:
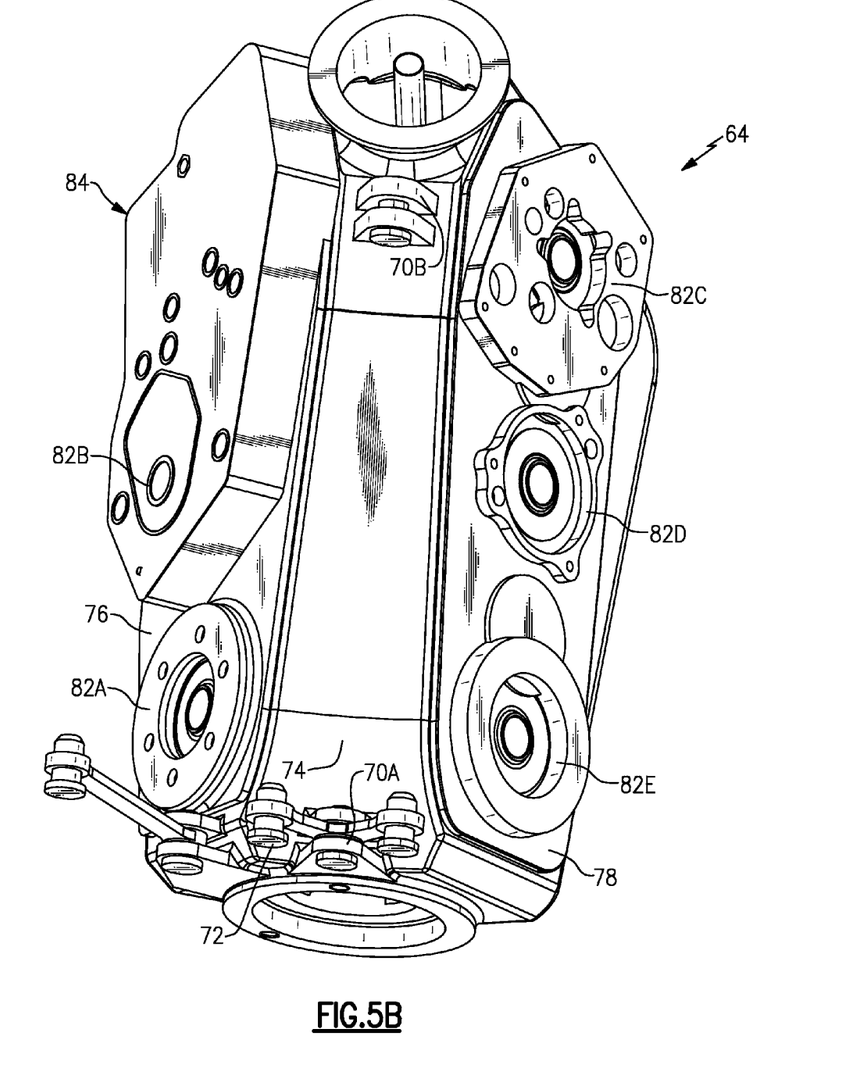
FIG. 5B is a general top view of an accessory system without the multiple of accessory components mounted thereto taken along line 5B-5B in FIG. 5A.
Figure 7:
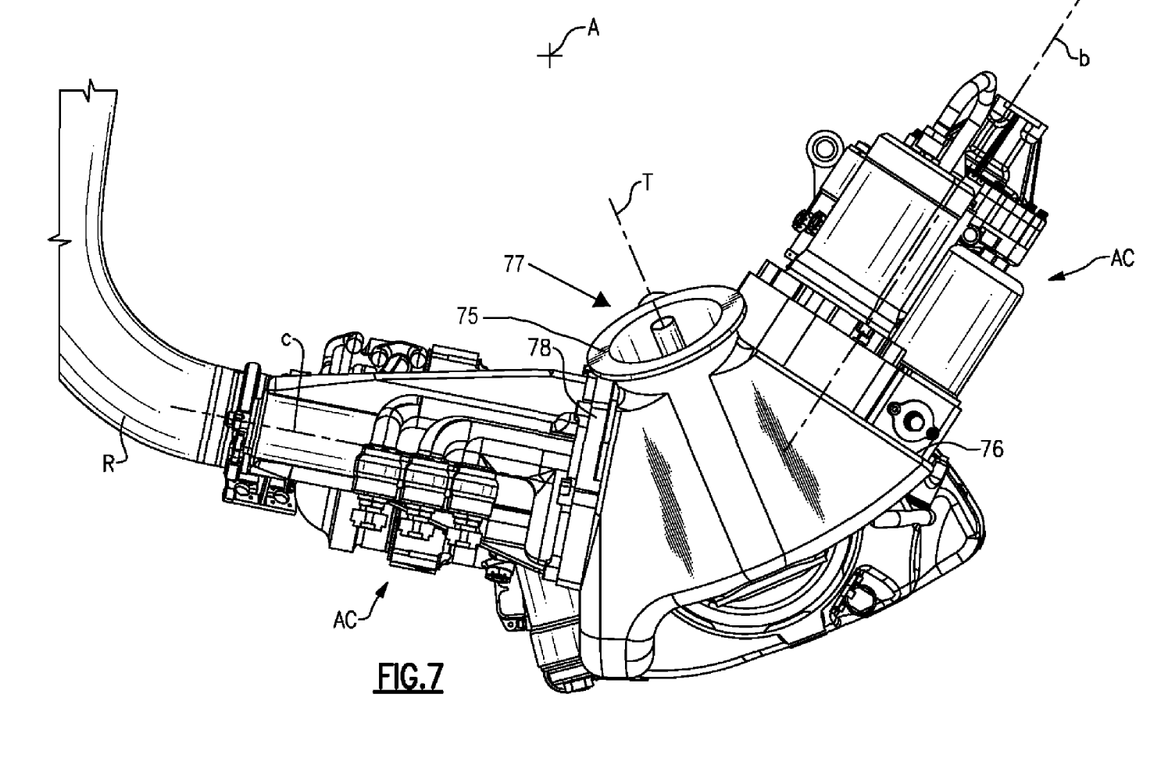
FIG. 7 is a front view of an accessory system with the multiple of accessory components mounted thereto.
Figure 8:
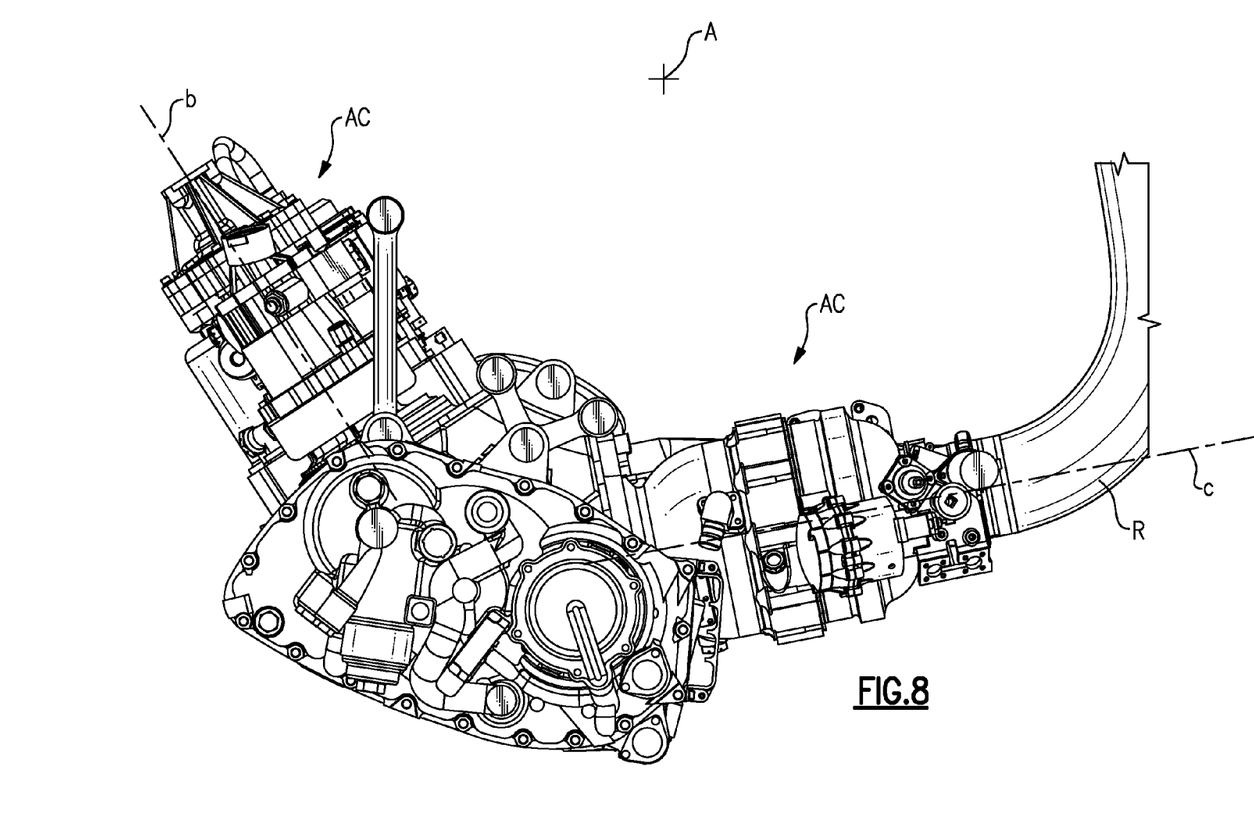
FIG. 8 is a rear view of an accessory system with the multiple of accessory components mounted thereto.
Figure 9:
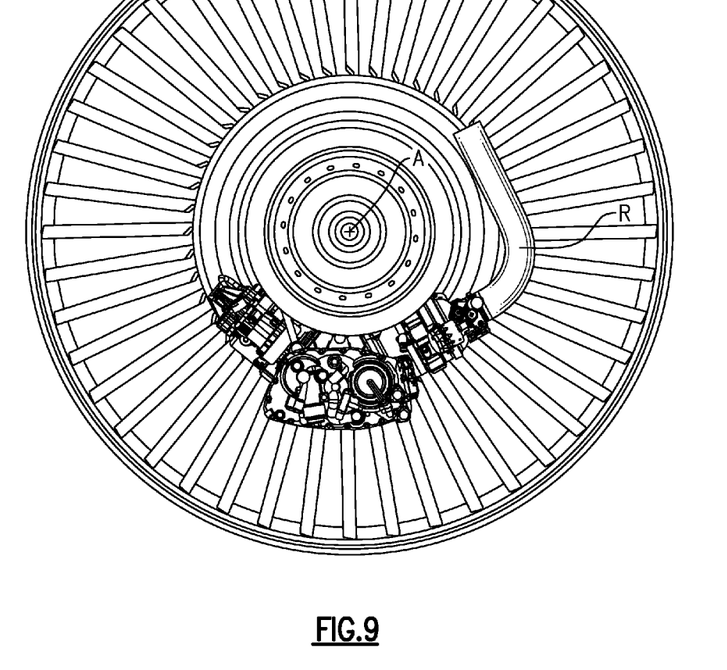
FIG. 9 is a rear view of the gas turbine engine a with an accessory system mounted thereto.

Referring to FIG. 5B, the covers 76, 78 define an accessory component pad 82A-82E to which the associated accessory component AC is mounted. The accessory component pads 82A-82E facilitate a V-orientation of the accessory components AC (FIGS. 7 and 8) with respect to the main case 74 to essentially straddle the engine case structure 44. That is, a mounting axis b of each accessory component AC on the first cover 76 and a mounting axis c of each accessory component AC on the second cover 78 define the V-orientation with respect to the layshaft axis of rotation L to straddle the engine axis of rotation A. This orientation provides a significant removability envelope for each accessory component AC as each accessory component AC extends in a radial outboard direction with regard to the layshaft axis of rotation L. The location of the accessory components AC also facilitates location of the accessory gearbox 60 and the accessory components AC forward within the core nacelle which provides a relatively lower temperature operating environment. The location of the accessory components AC further facilitates service line routes which typically require a relatively large bend radius R (FIG. 9).

In one non-limiting embodiment, the first cover 76 may additionally include a manifold 84. The manifold 84 may be a fuel manifold which supports a multiple of fluidly connected components such as a fuel pump, FMU and a fuel filter in a module arrangement.

In one non-limiting embodiment, the Integral Drive Generator (IDG) is mounted along the layshaft axis of rotation L (best seen in FIGS. 2 and 3). That is, the layshaft axis of rotation L may be in line with the input axis of rotation for the IDG. The axial arrangement of the IDG and layshaft 68 provides a mounted location where there is more room for a relatively larger more powerful generators.

Figure 5C:
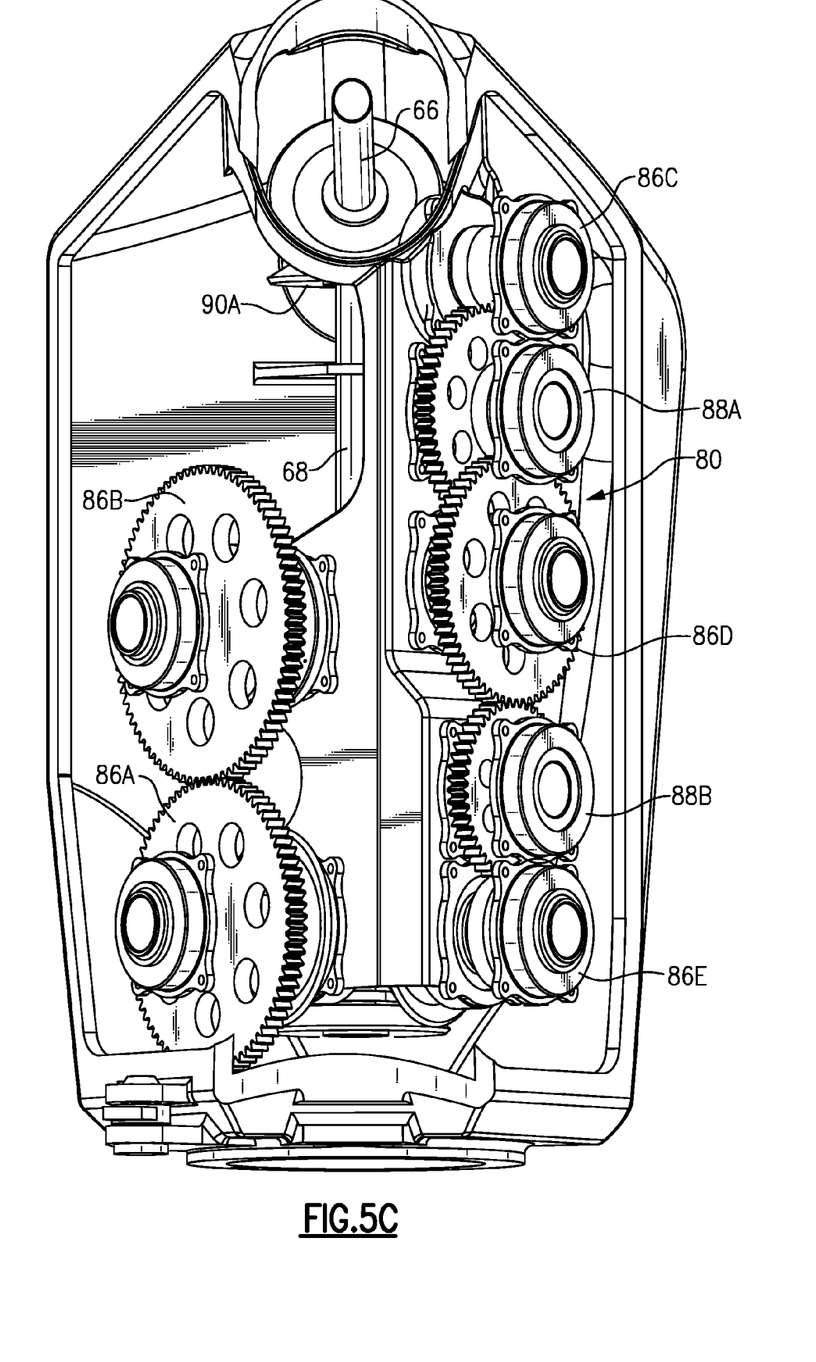
FIG. 5C is a general sectional top view of an accessory system without the multiple of accessory components mounted thereto taken along line 5C-5C in FIG. 5A.

Referring to FIG. 5C, the geartrain 80 includes a multiple of drive gears 86A-86E which may be interconnected by a multiple of idler gears 88A-88B. The geartrain 80 within the accessory gearbox section 60 drives each auxiliary engine component AC at the proper speed. That is, each drive gear 86A-86E drives the respective accessory component AC.

The towershaft 66 is supported within the main case 74 through an opening 75 at an axial and radially inward end 77 (relative to axis A) thereof (see FIG. 7) in meshing engagement with the layshaft 68 through a first gear arrangement 90A such as a bevel gear arrangement. The layshaft 68 is supported within the main case 74 (FIG. 5D) to drive a second gear arrangement 90B which may include a bevel gear 90B which is in meshing engagement with drive gears 86A and 86E (shown in FIG. 5C). That is, the bevel gear 90B is in meshing engagement with drive gears 86A and 86E to drive the entire geartrain 80.

Figure 5D:
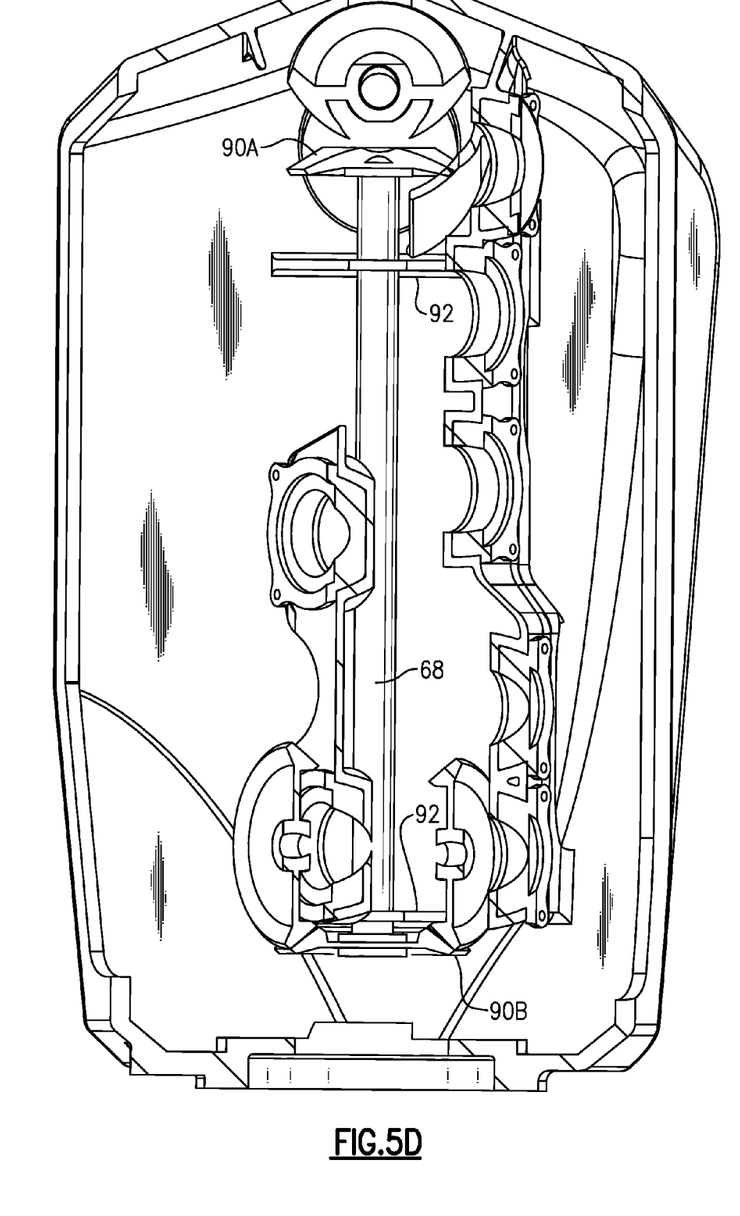
FIG. 5D is a general sectional top view of an accessory system without the multiple of accessory components mounted thereto taken along line 5D-5D in FIG. 5A.

Referring to FIG. 5D, the layshaft 68 is supported within housing assembly 64 through bearing supports 92 within the main case 74. The integration of towershaft 66 (not shown), layshaft 68 and geartrain 80 (not shown) within the main case 74 provides a significant overall weight reduction. Also, the location of the layshaft 68 within the main case 74 facilitates lubrication as well as common lubrication system integration of the towershaft 66 (not shown), the layshaft 68 and the geartrain 80 (not shown).

Figure 10:
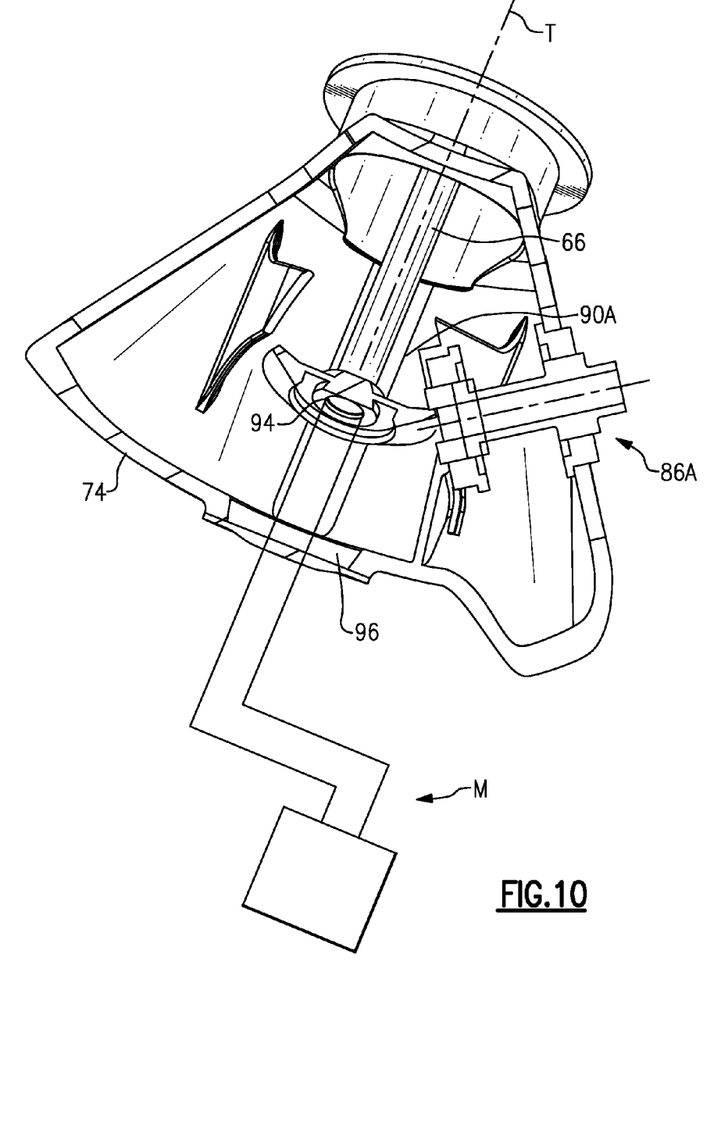
FIG. 10 is a sectional view of the accessory system with a manual crank attached thereto.

Referring to FIG. 10, the towershaft 66 may also include a socket 94 adjacent the first gear arrangement 90A to receive a manual crank (illustrated schematically at M) which will facilitate maintenance and other operations. An access port 96 is located through the main case 74 along the towershaft axis of rotation T to provide attachment of the manual crank M in a readily accessible and operable location.

The accessory gearbox 60 reduces component complexity, part count, and weight through elimination of bolted flanges and additional structure typical of a separate angled gearbox housing. This integration is best implemented for accessory gearboxes mounted close to the engine case, and in the case of this disclosure, gearboxes which are axially-oriented.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An accessory system for a gas turbine engine having a central axis passing therethrough, said accessory system comprising:
    an accessory gearbox having a first face and a second face wherein said first face and said second face are oriented relative to each other to form a v-orientation;
    a layshaft within said accessory gearbox along a layshaft axis of rotation said layshaft axis in parallel with said central axis;
    a first accessory component mountable to said first face along a first accessory axis transverse to said layshaft axis of rotation, said first accessory component driven by said layshaft;
    a second accessory component mounted to said second face along a second accessory axis transverse to said layshaft axis of rotation; and
    a single towershaft to be disposed transverse to said gas turbine engine axis of rotation, said tower shaft for driving said layshaft wherein said layshaft drives said first and second accessories.

2. The accessory system of claim 1 wherein said first face is removable from said accessory gearbox to enable access to a gear within said gearbox.

3. The accessory system of claim 1 wherein said first accessory component and said second accessory component are mounted to an outside of said first face and said second face relative to said accessory gearbox.

4. The accessory system of claim 1 wherein said tower shaft enters said accessory gearbox at an axial end thereof.

5. The accessory system of claim 4 wherein said tower shaft enters said accessory gearbox at a radially inward end thereof.

6. The accessory system of claim 1 wherein said first face has a manifold disposed thereon.

7. The accessory system of claim 1 wherein said layshaft comprises a single layshaft.

8. A gas turbine engine comprising:
    an engine case section defined about an engine axis of rotation;
    an accessory gearbox having a first face and a second face wherein said first face and said second face are oriented relative to each other to form a v-orientation;
    a layshaft within said accessory gearbox along a layshaft axis of rotation said layshaft axis in parallel with said central axis;
    a first accessory component mountable to said first face along a first accessory axis transverse to said layshaft axis of rotation, said first accessory component driven by said layshaft;
    a second accessory component mounted to said second face along a second accessory axis transverse to said layshaft axis of rotation; and
    a single towershaft transverse to said gas turbine engine axis of rotation extending from said engine case section and driving said layshaft wherein said layshaft drives said first and second accessories.

9. The gas turbine engine as recited in claim 8, wherein said first accessory axis and said second accessory axis straddle said engine case section.

10. The gas turbine engine as recited in claim 8, wherein said engine case section is an engine core case section.

11. The accessory system of claim 8 wherein said tower shaft enters said accessory gearbox at a radially inward end thereof adjacent said engine core case section.

12. The accessory system of claim 11 wherein said tower shaft enters said accessory gearbox at an axial end thereof.

13. The accessory system of claim 8 wherein said first face has a manifold disposed thereon.

14. The accessory system of claim 13 wherein said manifold is a fuel manifold.

15. The accessory system of claim 8 wherein said layshaft comprises a single layshaft.

* * * * *